Figure 1:
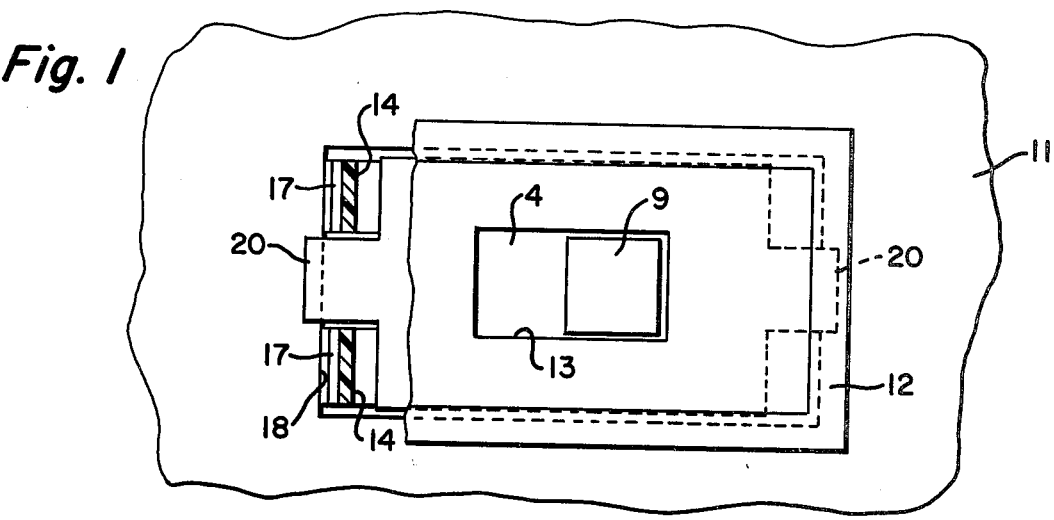

United States Patent [19]

Quigley

[11] 4,211,905
[45] Jul. 8, 1980

[54] SLIDE SWITCH ASSEMBLY FOR MOUNTING IN A PANEL

[75] Inventor: Thomas J. Quigley, Farmville, Va.

[73] Assignee: Stackpole Components Company, Raleigh, N.C.

[21] Appl. No.: 12,160

[22] Filed: Feb. 14, 1979

[51] Int. Cl.² .............................................. H01H 9/00
[52] U.S. Cl. .................................... 200/295; 200/296; 248/27.3
[58] Field of Search .............................. 200/295, 296; 174/138 R, 138 G, 153 G, 66; 248/27.1, 27.3, DIG. 6

[56] References Cited

U.S. PATENT DOCUMENTS

| | | | |
|---|---|---|---|
| 2,446,141 | 7/1948 | Parsons | 200/295 |
| 2,934,560 | 4/1960 | Thompson et al. | 174/66 X |
| 3,011,008 | 11/1961 | Slater | 200/295 X |
| 3,213,189 | 10/1965 | Mitchell et al. | 200/295 X |
| 3,337,708 | 8/1967 | Cerveny et al. | 200/296 X |
| 4,137,602 | 2/1979 | Klumpp, Jr. | 174/153 G X |

FOREIGN PATENT DOCUMENTS 2559398 9/1976 Fed. Rep. of Germany ........... 200/295

*Primary Examiner*—Stephen Marcus
*Attorney, Agent, or Firm*—Brown, Flick & Peckham

[57] ABSTRACT

A rectangular slide switch housing has a top wall with a longitudinal slot in it, the wall being provided with integral tabs projecting lengthwise from its opposite ends. Inside the housing is a contact-actuating slide provided with a button projecting out through the slot and movable lengthwise thereof. A switch holder for mounting the switch in a rectangular opening in a panel includes a face plate overlying the top wall of the switch and projecting laterally from the sides and ends of the housing. The plate is provided with a longitudinal slot, through which the slide button extends, and with a pair of laterally spaced resilient legs extending downwardly at each end of the housing, the upper ends of the legs being joined to the plate close to the ends of the housing but spaced inwardly from the ends of the plate. Each leg has an intermediate shoulder underlying the adjoining end of the switch for holding it against the plate. A spring prong joined to the lower end of each leg extends upwardly therefrom and is spaced outwardly from the leg with a free upper end portion for pressing laterally against an end of the panel opening when the switch and legs and prongs are pressed down into that opening with the face plate overlapping the panel around the opening. The switch housing tabs extend outwardly between the laterally spaced legs far enough to overlie the panel, whereby the tabs will be clamped between the face plate and the panel.

3 Claims, 3 Drawing Figures

SLIDE SWITCH ASSEMBLY FOR MOUNTING IN A PANEL

Electric switch holders have been proposed for insertion in panel openings to mount the switches in the panels. With such holders a switch is supported entirely by the holder, which is not entirely satisfactory because in use the switch may be disengaged from its holder and thus separate from the panel.

It is among the objects of this invention to provide a slide switch assembly in which a slide switch can be quickly and easily attached to a holder, in which the switch is supported entirely by the holder until the assembly is inserted in a panel opening, and with which the switch can be clamped between the panel and a portion of the holder overlying the switch so that the switch cannot become separated from the holder and panel.

Figure 2:
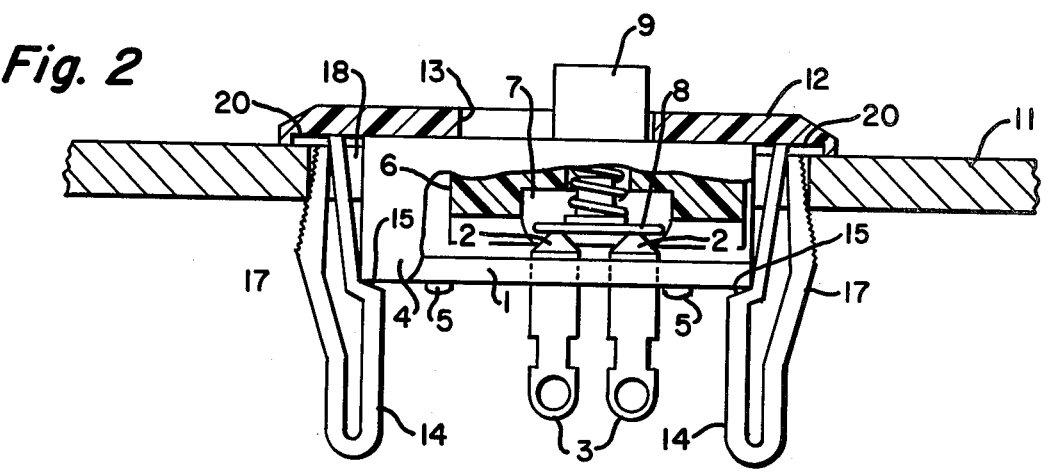
Figure 3:
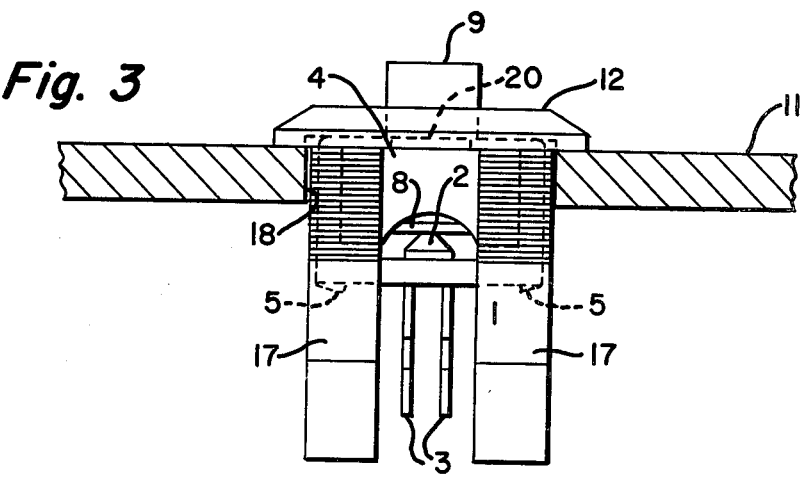

The preferred embodiment of the invention is illustrated in the accompanying drawings, in which FIG. 1 is a plan view, partly broken away;
FIG. 2 is a central vertical longitudinal section; and
FIG. 3 is an end view.

Referring to the drawings, a conventional slide switch is shown that has an insulating base 1, on which there are two or more fixed contacts 2 arranged in a line extending lengthwise of the base. The contacts are provided with integral terminals 3 extending down through the base. Attached to this base is an inverted channel shaped metal case 4 having a top wall parallel to the base and having side walls with tabs 5 at their lower edges bent under the base to connect the two members together. The case and base together form a rectangular switch housing.

Inside the case there is a slide 6 that is provided with a recess 7 containing the usual bridging contact 8 for engaging two of the fixed contacts at the same time. The top of this slide is provided with a button 9 that extends through the usual longitudinal slot in the top wall of the case. By moving the button from one end of the slot to the other, switching can be accomplished to either turn the switch on and off or to switch circuits, depending upon the number of fixed contacts.

It is a feature of this invention that an adapter or holder for the switch is provided for mounting it in a rectangular opening in a panel 11. Accordingly, the switch holder, preferably molded in one piece from a suitable plastic, has a face plate 12 overlying the top wall of the switch in engagement with it. The sides and ends of the plate project laterally from the switch. The plate is provided with a longitudinal slot 13, through which the slide button 9 extends.

As shown in FIGS. 2 and 3, a pair of laterally spaced resilient legs 14 extend downwardly from the face plate at each end of the switch housing, the upper ends of the legs being joined to the plate close to the ends of the housing but spaced inwardly from the ends of the plate. Each leg has an intermediate shoulder 15 (FIG. 2) that underlies the adjoining end of the switch housing in engagement with it. The four shoulders hold the switch against face plate 12. The switch is assembled with the holder by merely moving the switch up between the legs, which will spring apart far enough to permit the switch housing to pass the leg shoulders, whereupon the shoulders will spring back beneath the housing to hold the switch in place.

Joined to the lower end of each leg 14 is a spring prong 17 that extends upwardly beside the outer side of the leg in spaced relation with the leg. The prong has a free upper end portion that is sprung inwardly toward the upper end of the leg when the holder is inserted in a rectangular opening 18 in the panel. The width of this opening is substantially the same as the width of the switch, and the length of the opening is less than the length of the face plate 12. The upper end portions of the four spring prongs press laterally against the end walls of the panel opening to hold the holder in place with its face plate overlapping the panel around the opening. The surfaces of the prongs that engage the end walls of the panel opening may be provided with transverse ridges or the like to increase the grip of the prongs on the panel.

An important feature of this invention is that the top wall of the switch housing is provided with a central integral tab 20 at each end that extends out between the adjacent laterally spaced legs 14 far enough to overlie the panel when the switch and legs and prongs are inserted in the panel opening. The underside of the face plate is recessed to receive the tabs and the top wall of the switch housing so that they will not prevent the edges of the plate from engaging the panel.

With this slide switch assembly inserted in the panel opening, the metal tabs 20 are clamped between the face plate and the panel as shown in FIG. 2, so that the switch will be supported or backed up directly by the panel and will not have to rely on the holder for support. Consequently, downward pressure on the slide button cannot disengage the switch from the holder or the panel.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A slide switch assembly for mounting in a panel having a rectangular opening therein for receiving the assembly, comprising a rectangular slide switch housing having a top wall provided with a longitudinal slot therein and also provided with integral tabs projecting lengthwise from the opposite ends of said wall centrally thereof, a contact-actuating slide in said housing, and a button projecting from the slide out through said slot and movable lengthwise of the slot for moving said slide back and forth in combination with a switch holder for mounting said switch in a panel opening, said holder comprising a face plate overlying the top wall of the switch in engagement therewith and projecting laterally from the sides and ends of said housing, said plate being provided with a longitudinal slot through which said button extends, and a pair of laterally spaced resilient legs extending downwardly from said plate at each end of said housing, the upper ends of the legs being joined to the plate close to the ends of the housing but spaced inwardly from the ends of the plate, each leg having an intermediate shoulder underlying the adjoining end of the housing in engagement therewith for holding the switch against the plate, and a spring prong joined to the lower end of each leg and extending upwardly therefrom spaced outwardly from the leg and having a free upper end portion for pressing laterally against an end of said panel opening when said switch and legs and prongs are pressed down into that opening with said plate overlapping the panel around said opening, and said housing tabs extending out between said laterally spaced legs far enough to overlie the panel when the switch is inserted in the panel opening, whereby the tabs will be clamped between said face plate and the panel.

2. A slide switch assembly according to claim 1, in which said switch holder is made of a plastic.

3. A slide switch assembly according to claim 1, in which said face plate is recessed to receive said housing top wall and tabs.

* * * * *